(12) United States Patent
 Kao

(10) Patent No.: US 7,998,256 B2
(45) Date of Patent: Aug. 16, 2011

(54) OXYGEN GENERATOR

(75) Inventor: Ta Hai Kao, Tainan (TW)

(73) Assignee: Yuun Tong Electronic Enterprise Co., Ltd., Tainan (TW)

( * ) Notice: Subject to any disclaimer, the term of this patent is extended or adjusted under 35 U.S.C. 154(b) by 201 days.

(21) Appl. No.: 12/289,044

(22) Filed: Oct. 20, 2008

(65) Prior Publication Data

US 2010/0095960 A1 Apr. 22, 2010

(51) Int. Cl.
*B01D 53/04* (2006.01)
*A62B 7/00* (2006.01)
(52) U.S. Cl. ............... 96/108; 422/120; 128/200.24; 96/121; 96/140
(58) Field of Classification Search ............ 422/33, 422/120; 261/62; 96/108, 113, 121, 140; 128/200.24
See application file for complete search history.

(56) References Cited

U.S. PATENT DOCUMENTS

| | | | | |
|---|---|---|---|---|
| 3,922,149 A | * | 11/1975 | Ruder et al. | 95/22 |
| 4,869,733 A | * | 9/1989 | Stanford | 95/19 |
| 5,928,610 A | * | 7/1999 | Moran et al. | 422/120 |

* cited by examiner

*Primary Examiner* — Sean E Conley
(74) *Attorney, Agent, or Firm* — Bacon & Thomas PLLC

(57) ABSTRACT

An oxygen generator comprising a body shell, a top cover set, a bottom cover set, an air pump, multiple switching solenoid valves and a watering control set; the body shell is provided with multiple big tanks filled with molecular sieve substances, its surrounding is provided with a gas intake passage, multiple sets of airflow channels, multiple sets of gas outtake channels, a gas storage tank and an air filtration tank; the body shell is further provided with multiple switching solenoid valves, which control both the circulation between two adjoined airflow channels and the circulation between an airflow channel and an adjoined gas outtake channel; the top cover set and the bottom cover set are installed on the top side and bottom side of the body shell respectively, and the air pump is set up under the bottom cover, while the watering control set is set up on the bottom cover.

8 Claims, 18 Drawing Sheets

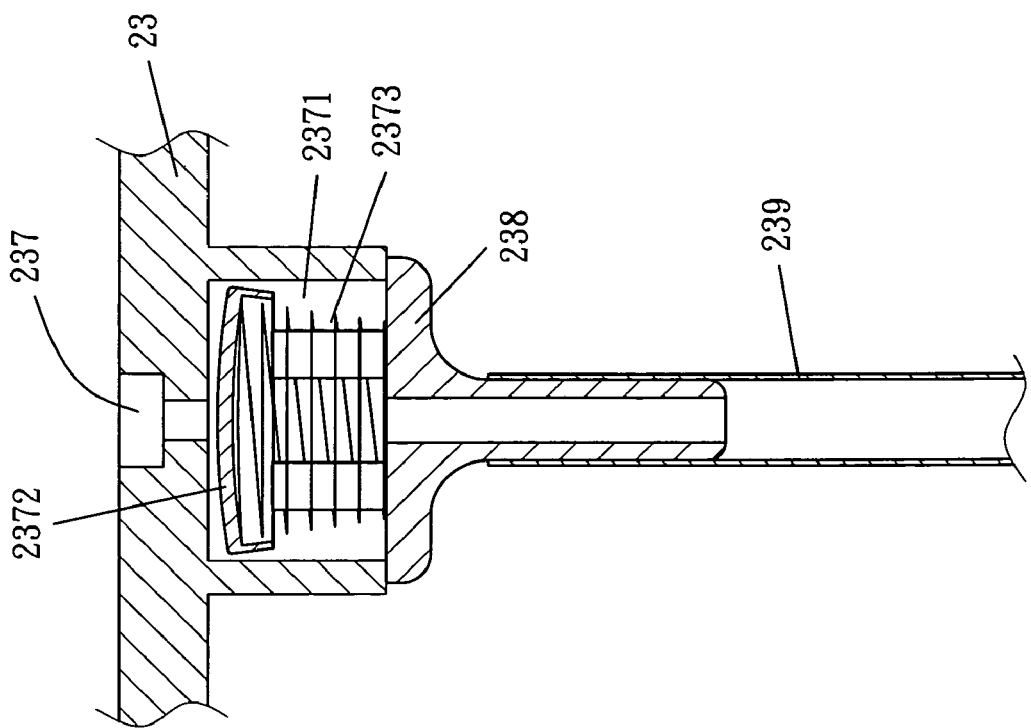
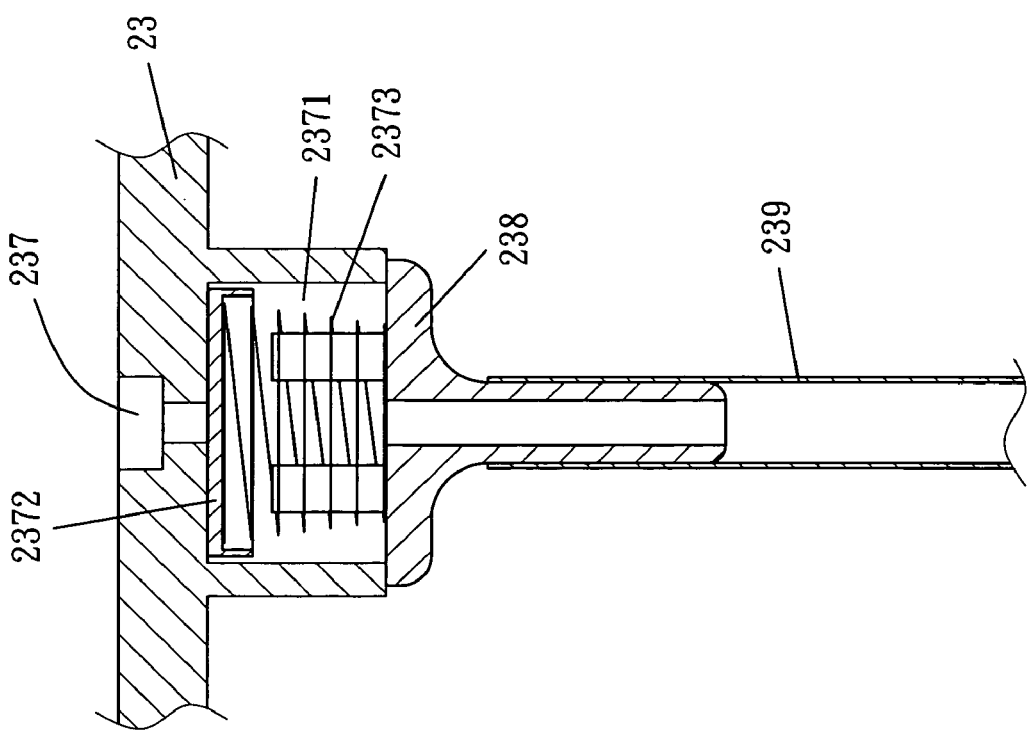

US 7,998,256 B2

OXYGEN GENERATOR

BACKGROUND OF THE INVENTION

1. Field of the Invention

The present invention relates to oxygen generators, and more particularly to one that is novel in combination pattern, compact in assembly, handy in carrying and transportation, and reducible in cost and price.

2. Description of the Prior Art

As the advancement on civilization of human society, medical technology and many important respects is boosted, human beings have already tremendous improvements on the research and control of diseases, and the average life-span of human is also lengthened, which definitely makes the arrival of the aging society an unavoidable trend. On the other hand, it has also brought about many adverse influences, wherein the severe damage of the global environment is most denounced. Therefore, at times inexplicable diseases (for instance: Severe Acute Respiratory Syndrome (SARS)) or extremely awful environment (for instance: rainstorm, bitter cold and torturing hot weather, or mudflows) indeed fight back to humans, and it deserves us to think over the whys. With a vast anxiety about the outside environment, and the inevitable dealing with the possibilities of being invaded by the gradually awful environment and the inexplicable diseases, human beings should be ready for all kinds of prevention, and oxygen is an absolutely indispensable element for humans to survive, where the oxygen generator, capable of self-producing oxygen, by introducing high pressure air to react with the internally filled molecular sieve substances, is an important first-aid appliance. Not only is the oxygen generator used in emergencies, it is also required by many symptoms of chronic diseases, for instance, it is essential to have the oxygen generator prepared anytime for the emergency use by the patients of asthma and dyspnoea. Moreover, the more pure oxygen that is breathed by people, the better circulation of blood results, which also enables the mind to be sharply nimble, the body to get rid of fatigues and the work efficiency to be substantially boosted. Therefore, during daily life or in the office, it is a great custom to equip with an oxygen generator ready anytime for the emergency.

Prior art oxygen generators are mostly made up of the off-the-shelf parts and modules Therefore, the volume of the assembly is unbound and bulky, which no doubt deteriorates the ability to carry or transport the oxygen generator, and it could further boost the cost that fails to offer a competitive price, which is really bad. In light of the aforesaid drawbacks, the inventor conceived an idea of achieving the oxygen generator that features novel in combination, compact in assembly, handy in carrying and reducible in cost and price.

SUMMARY OF THE INVENTION

The objective of the present invention is to provide an oxygen generator of novel in combination pattern, compact in assembly, handy in carrying and transportation, and reducible in cost and price.

To be aimed at the aforementioned objective, the present invention developed an oxygen generator, comprising a body shell, a top cover set, a bottom cover set, an air pump, a plurality of switching solenoid valves and a watering control set; wherein the body shell is shaped into a plurality of connecting septum walls at its internal that form multiple big tanks which are filled with molecular sieve substances, where its surrounding is provided with a gas intake passage, multiple sets of airflow channels, multiple sets of gas outtake channels, a gas storage tank and an air filtration tank for filling with pure water; the body shell, at its bottom, is provided with a through hole that corresponds to the gas intake passage, a plurality of through holes that correspond to the airflow channels, a plurality of through holes that correspond to the gas outtake channels, a plurality of through holes that correspond to the big tanks, and a through hole that corresponds to the air filtration tank; the body shell is provided with a plurality of mounting recesses and a mounting through recess, where each mounting recess is provided with a through hole connecting the adjoined airflow channels, or a through hole joining an airflow channel to an adjoined gas outtake channel; the mounting recesses accommodate switching solenoid valves respectively, to control both the circulation between two adjoined airflow channels and the circulation between an airflow channel and an adjoined gas outtake channel; the mounting through recess accommodates a filtration slice.

The top cover set is made up of a top cover, a first top spacer, a middle cover and a second top spacer, which are assembled fixedly on the top of the body shell; the top cover is provided with an outtake tube set up on its top side; the first top spacer closely attaches to the bottom side of the top cover, having a through hole which tightly accommodates the penetration of the bottom segment of the outtake tube; the middle cover closely attaches to the bottom side of the first top spacer, having a through hole which tightly accommodates the penetration of the bottom segment of the outtake tube; the middle cover is provided with a plurality of air caves corresponding to the aforesaid big tanks on its top side, while its bottom side has downward through holes, where the air caves each has a duct and both are joined and flow down through a gas collecting hole, a reverse-way barricade device is set up in the range from the air cave connecting to the duct to the outlet of the gas collecting hole, an upward vent hole is set up in front of the gas collecting hole, which extends to the top side of the middle cover and a trench is set up therein, and the other end of the trench is made into a piercing tube stretching downward; the piercing tube is for insertion by an extension tube which is placed into the air filtration tank; the second top spacer is closely positioned in between the bottom side of the middle cover and the top side of the body shell, where the second top spacer is provided with a through hole for offering a tight penetration by the bottom portion of the outtake tube; through holes are set up at the places that correspond to the through holes of the middle cover, the gas collecting hole, the vent hole and the piercing tube respectively, where the through holes corresponding to the through holes of the middle cover are connected to the big tanks respectively; the through holes corresponding to the gas collecting hole and the vent hole are connected to the gas storage tank; and the through holes corresponding to the piercing holes are connected to the air filtration tank.

The bottom cover set is made up of a bottom cover and a bottom spacer, which are installed down the bottom side of the body shell; the top side of the bottom cover is provided with a downward piercing hole that corresponds to the through hole at the bottom side of the gas intake passage of the body shell, and two downward piercing holes are placed near two side edges respectively, where the piercing holes each joins a curved trench on the top side of the bottom cover, and a trench is set up near each of two sides; the bottom cover is provided with a plug dent at its back side; the bottom spacer is placed closely between the bottom cover and the bottom side of the body shell, and it is provided with aligned piercing holes that correspond to the through holes at the bottom side of the gas intake passage of the body shell, the bottom spacer is provided with aligned piercing holes that correspond to the piercing holes at both side edges of the bottom cover having no connection to the trench, and piercing holes are set up corresponding to the other ends of the curved trenches; moreover, piercing holes are set up that correspond to the both ends of the other trenches respectively.

The air pump, offered the bottom cover to place thereon for a fixed joining, has a gas-in hole that corresponds to the piercing hole of the bottom cover, which further corresponds to the through hole at the bottom side of the gas intake passage of the body shell, and the outtake tubes that correspond to the piercing holes near both side edges of the bottom cover connected to the trenches.

The watering control set is made up of an outer shell, an inner block, a blocking ring, an elastic article, a back cover, a front plug tube and a tightening ring; the outer shell is used for inserting in the plug dent at the back of the bottom cover for a firm joining, its internal forms a lengthwise chamber, and a through hole is extended to the top of the shell, where the middle portion of its internal has an annular wall, and a top and a bottom aligned dents are positioned right at the front entrance of the chamber, a short distance from the entrance the shape becomes an arced trough; the inner block is provided with an annular bulge, and its back end shapes a cylinder, while the front end is a movable pillar, on which several lengthwise grooves are set up; the block ring is put on the movable pillar of the inner block and placed to the innermost, where the inner block is being inserted into the lengthwise chamber from the backend opening of the outer shell, and further the movable pillar is entered into the front of the annular wall, until a reach to the annular wall by the annular bulge and the block ring that comes to a completely sealed state, and the elastic article is put on the cylinder, followed by covering the backend opening of the outer shell by the back cover, such that one end of the elastic article jostles against the annular bulge, and the other end against the back cover; the internal of the front plug tube is lengthwise hollow, and its outer surface is provided with a joining trough for lodging the tightening ring, and has two protruded chunks symmetrically located at the top and the bottom, where its internal is provided with a circular channel wall.

In the foregoing oxygen generator, the top cover has multiple trenches on its bottom side, where the trenches each has one end extending out from a lateral side of the top cover to form a through hole, and a switching solenoid valve is installed thereon; the first top spacer has a small piercing hole set up at the location corresponding to each end of the trenches at the bottom side of the top cover; the middle cover has a small piercing hole corresponding to each of the small piercing holes on the first top spacer; the second top spacer has a small piercing hole set up at the location corresponding to each of the small piercing holes on the middle cover, where the small piercing holes are connected to the big tanks; the activation of a switching solenoid valve enables the higher pressure gas in one of the big tank to pass through the corresponding adjoined small piercing hole to the corresponding trench, followed by flowing to another trench through the switching solenoid valve, and passing through the corresponding adjoined small piercing hole to the other big tank.

In the foregoing oxygen generator, the reverse-way barricade device can be implemented by placing a gas shut membrane in each air cave. Once air enters the air cave from the through hole of the middle cover, it will open out the gas shut membrane and flow up and along the passage to pass through the gas collecting hole and the through hole, and enters the gas storage tank for a stay; whereas the reverse-way air presses the gas shut membrane to cover the through holes, to achieve the barricade of the reverse flow of air.

In the foregoing oxygen generator, the reverse-way barricade device can be implemented by shaping a lodging cavity placed below the end of the trench on the top side of the middle cover, for accommodating a gas shut membrane, jostled by one end of an elastic article, and below it one end of the piercing tube is inserted in the lodging cavity and jostled against the other end of the elastic article for a firm joining, where the bottom end of the piercing tube is inserted in the extension tube which is placed in the air filtration tank, once the air flows from the trench to the lodging cavity, it will push the gas shut membrane to resist the elasticity of the elastic article, which brings in deformation at the edges that will let the air flow in, and along the extension tube into the air filtration tank; whereas the reverse-way air pushes the gas shut membrane to cover the trench, which achieves the barricade of the reverse flow of air.

In the foregoing oxygen generator, the quantity of aforementioned multiple big tanks is more than (equal to) two.

In the foregoing oxygen generator, the quantity of aforementioned multiple sets of airflow channels that correspond to the big tanks is more than (equal to) two.

In the foregoing oxygen generator, the quantity of aforementioned multiple sets of gas outtake channels that correspond to the big tanks is more than (equal to) two.

In the foregoing oxygen generator, the quantity of aforementioned multiple trenches that correspond to the big tanks is more than (equal to) two.

BRIEF DESCRIPTION OF THE DRAWINGS

FIG. 18 is a schematic assembled sectional view of the gas shut membrane of another exemplified embodiment of the present invention;

FIG. 19 is a schematic sectional view of the function for the gas shut membrane of another exemplified embodiment of the present invention;

DETAILED DESCRIPTION OF THE INVENTION

To achieve the foregoing objects of the present invention, the techniques adopted and the achievable functioning are detailed described with reference to the following preferred exemplified embodiments and the accompanying drawings, which helps a thorough comprehension of the present invention.

Figure 2:
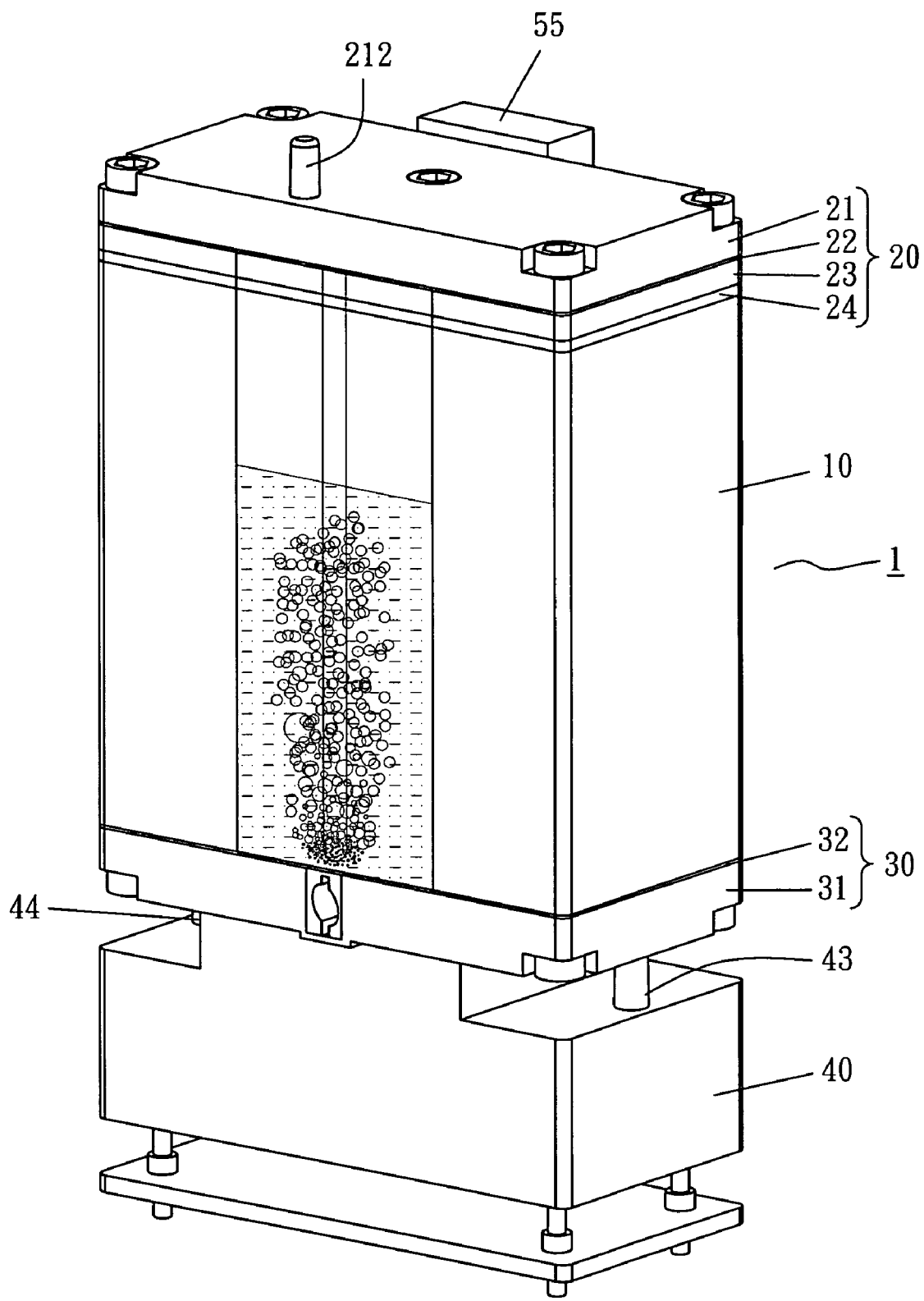
FIG. 2 is a three-dimensional exterior rear elevation of the exemplified embodiment of the present invention.
Figure 3:
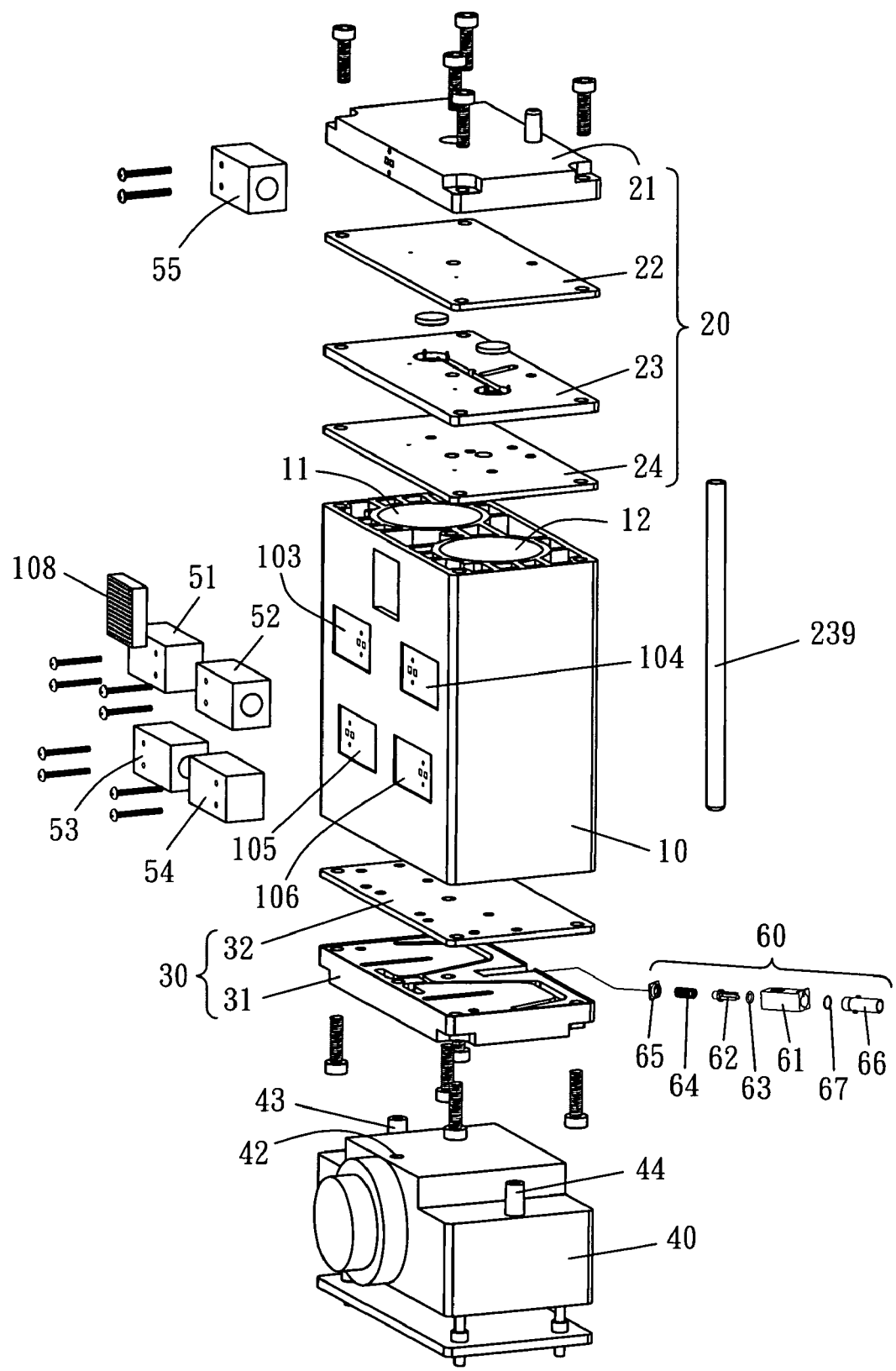
FIG. 3 is a three-dimensional exploded front and top elevation of the exemplified embodiment of the present invention.
Figure 4:
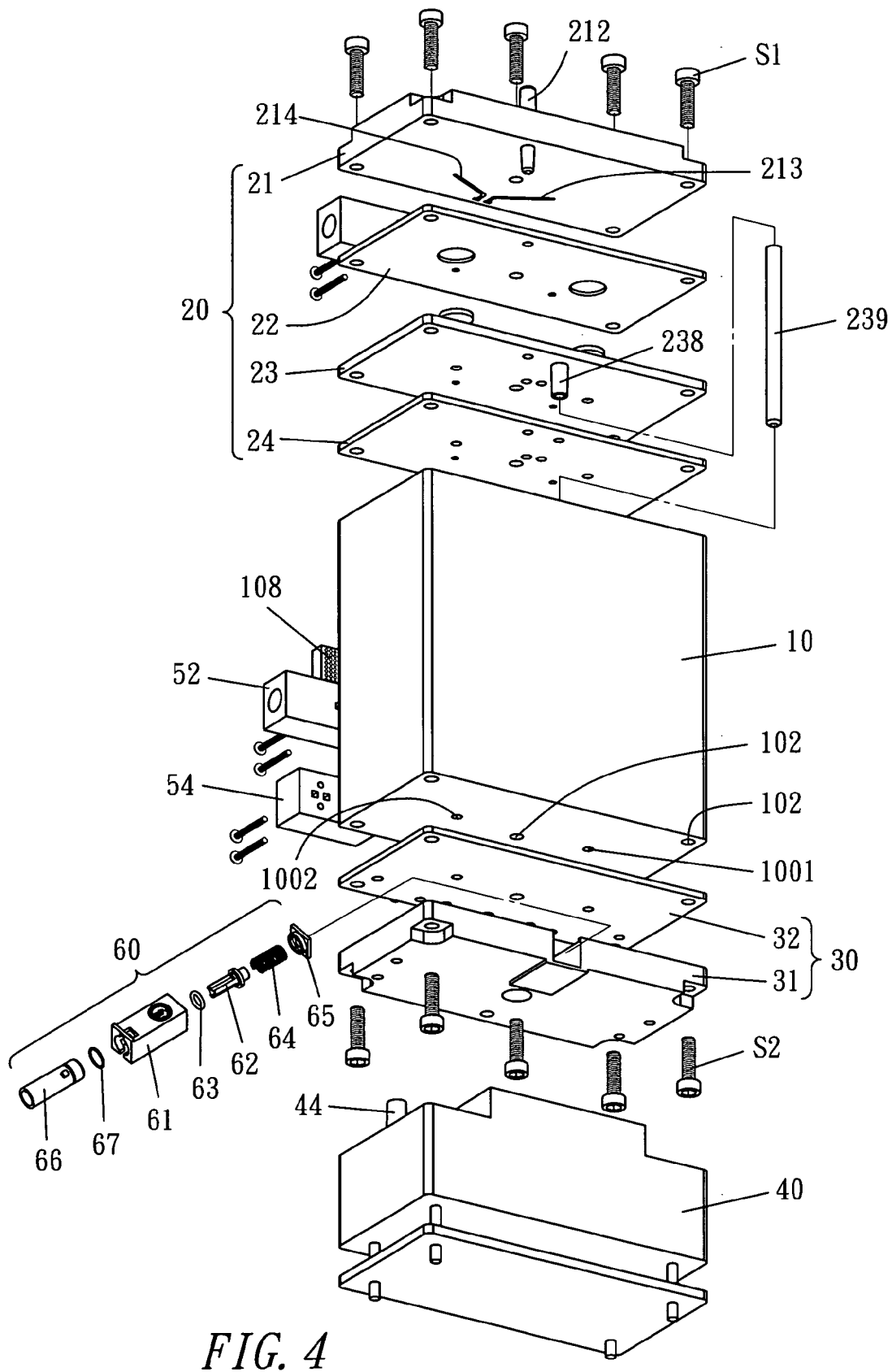
FIG. 4 is a three-dimensional exploded rear and bottom elevation of the exemplified embodiment of the present invention.
Figure 5:
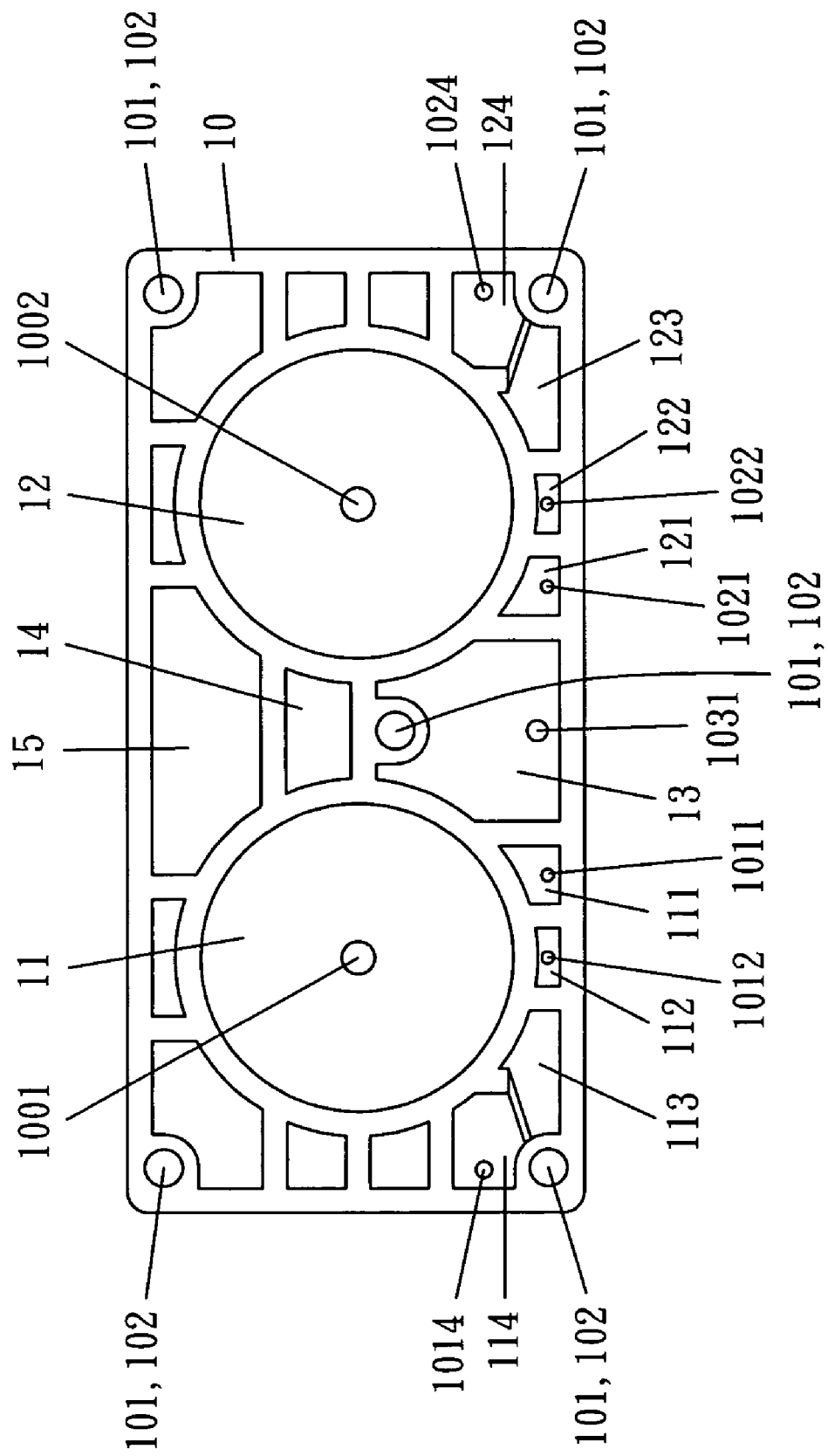
FIG. 5 is a top view of the body shell of the exemplified embodiment of the present invention.
Figure 6:
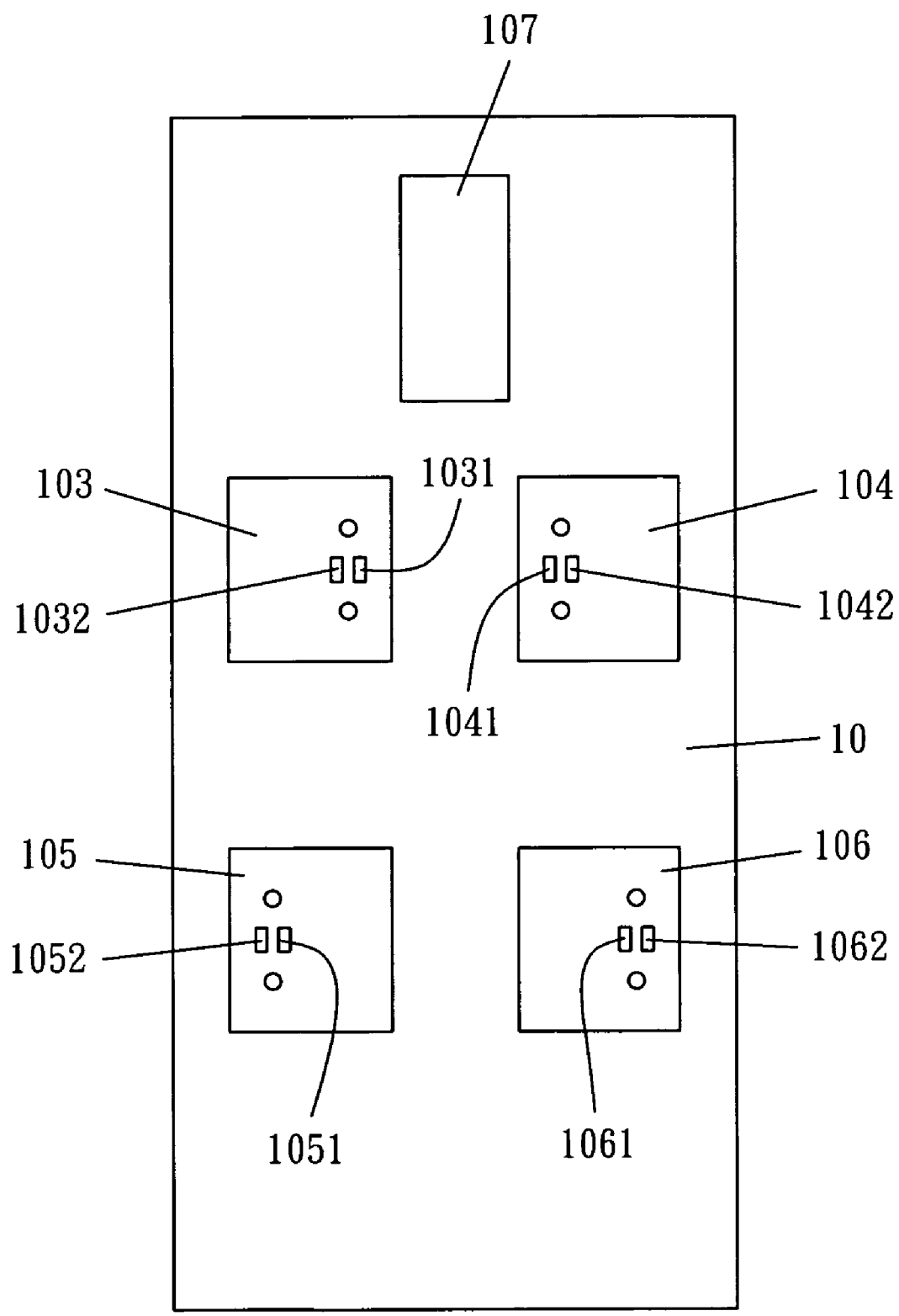
FIG. 6 is a front view of the body shell of the exemplified embodiment of the present invention.
Figure 7:
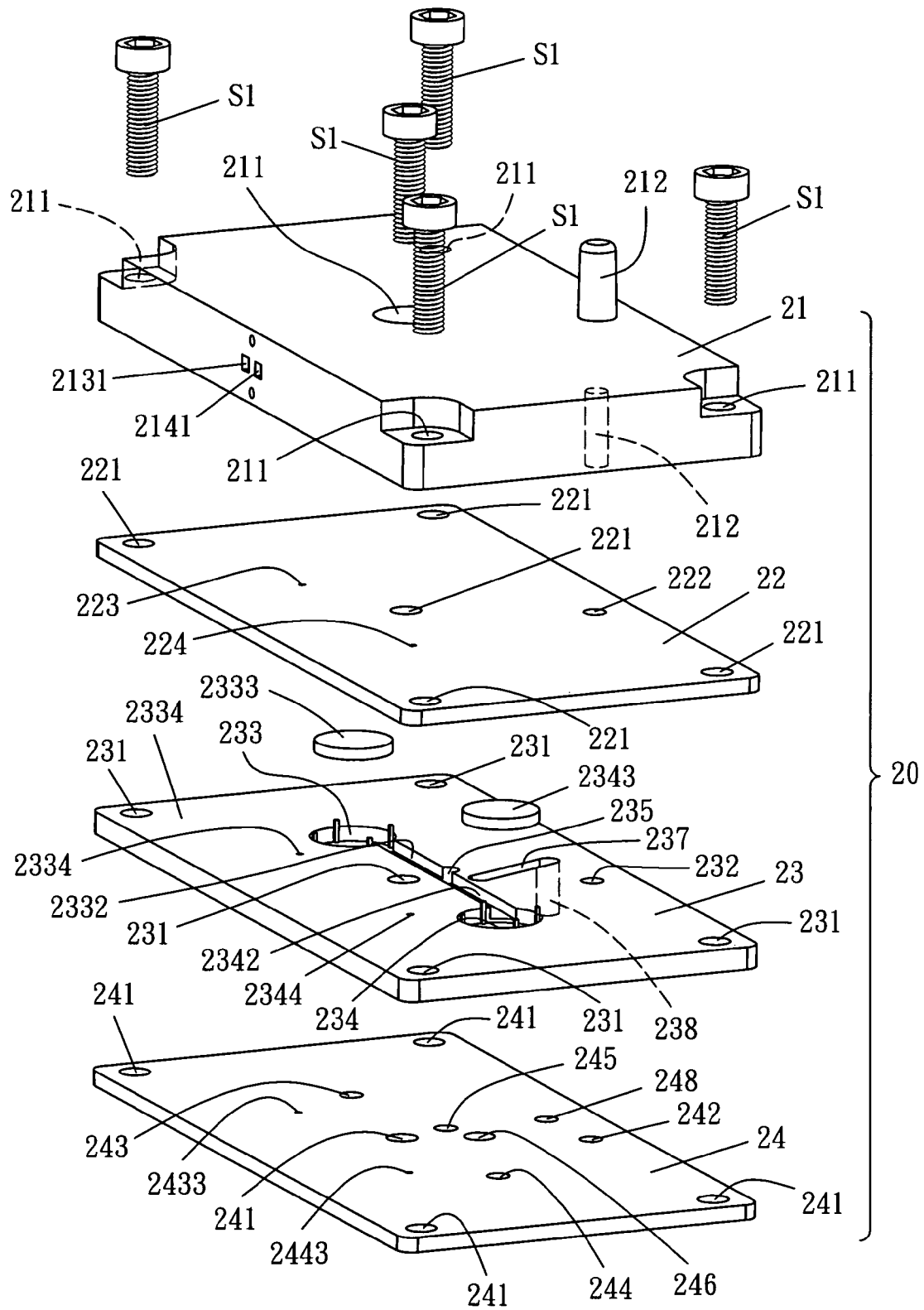
FIG. 7 is a three-dimensional exploded front and top elevation of the top cover set of the exemplified embodiment of the present invention.
Figure 8:
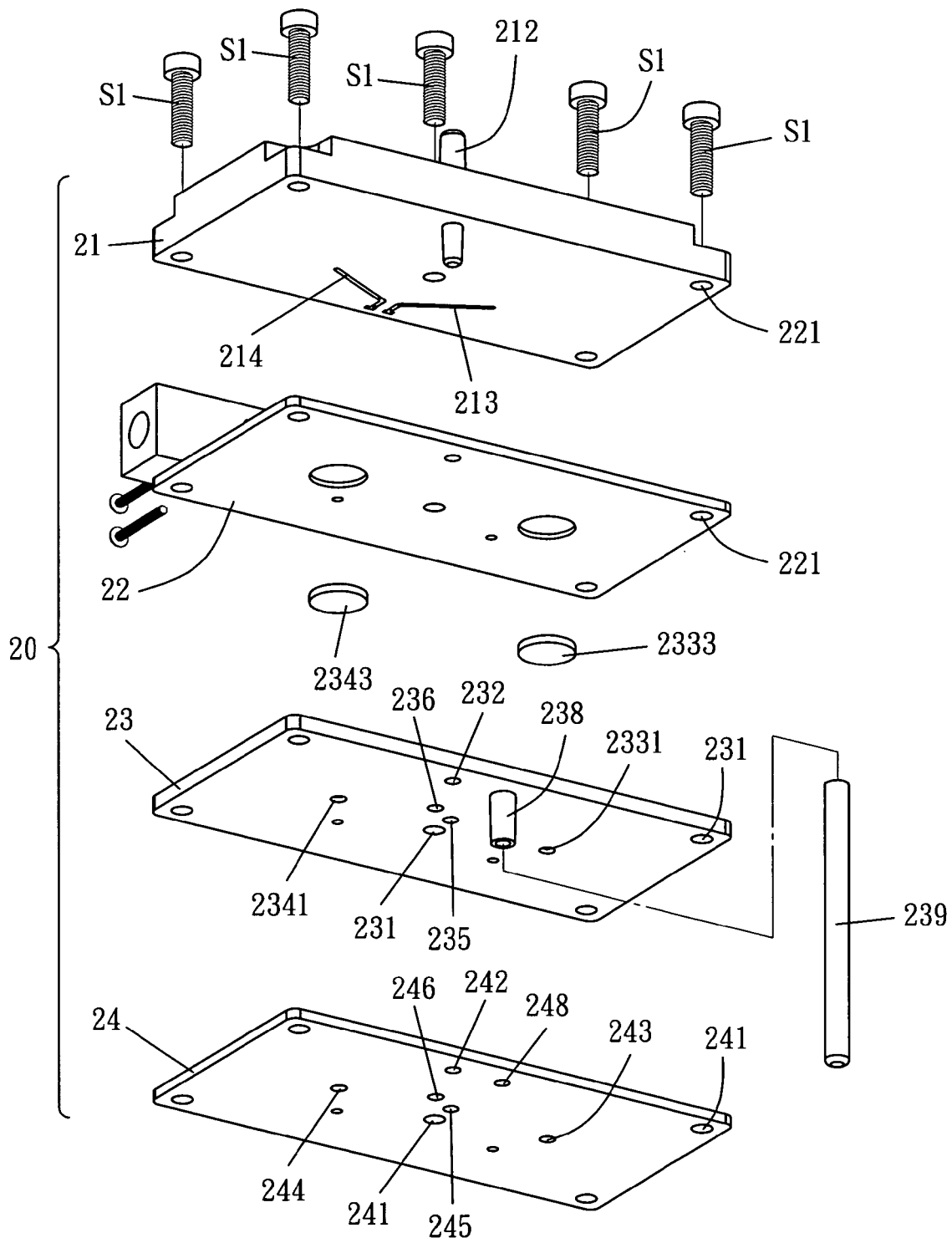
FIG. 8 is a three-dimensional exploded rear and bottom elevation of the top cover set of the exemplified embodiment of the present invention.

Referring to FIGS. 1-4, the exemplified embodiment of the present invention is an oxygen generator 1, comprising a body shell 10, a top cover set 20, a bottom cover set 30, an air pump 40, a plurality of switching solenoid valves 51, 52, 53, 54 and 55, and a watering control set 60; wherein the body shell 10 is a cuboid, shown in FIG. 5, viewing from the top, the body shell 10 is provided with a mounting hole 101 at each of four corners and the center at its top side, and having a plurality of connecting septum walls that form a left and a right big tanks 11, 12 at its internal, where its surrounding is provided with a gas intake passage 13, two sets of airflow channels at left side 111, 112 and at right side 121, 122, two sets of gas outtake channels at left side 113, 114 and at right side 123, 124, a gas storage tank 14, and an air filtration tank 15; referring to FIGS. 4 & 5, the body shell 10 is provided with a mounting hole 102 at each of four corners and the center at its bottom side, and the bottom side is provided with a through hole 1013 corresponding to the gas intake passage 13, through holes 1011, 1012 and 1021, 1022 corresponding to the airflow channels 111, 112 and 121, 122 respectively, through holes 1014, 1024 corresponding to the gas outtake channels 114 and 124 respectively, through holes 1001, 1002 corresponding to the big tanks 11, 12 respectively, and a through hole 1015 corresponding to the air filtration tank 15; referring to FIG. 6, the body shell 10 is provided with mounting recesses 103, 104, 105, and 106 at its back side and a mounting through recess 107 above them, where the mounting recess 103, 104 are provided with through holes 1031, 1041 which connect to the airflow channels 111, 121 and through holes 1032, 1042 which connect to the gas outtake channels 112, 122; the mounting recesses 105, 106 are provided with through holes 1051, 1061 connected to the airflow channels 112, 122 respectively and through holes 1052, 1062 connected to the gas outtake channels 113, 123; the mounting recesses 103, 104, 105, and 106 are provided with switching solenoid valves 51, 52, 53, and 54; the function of the switching solenoid valves 51, 52 is to conduct the airflows in the airflow channels 111, 121 flow through the through holes 1031, 1032 and 1041, 1042 to the airflow channels 112, 122 respectively; and the function of the switching solenoid valves 53, 54 is to conduct the airflows in the airflow channels 112, 122 flow through the through holes 1051, 1052 and 1061, 1062 to the gas outtake channels 113, 123 respectively; the mounting through recess 107 is provided with a filtration slice 108.

Referring to FIGS. 3, 4, 7 & 8, the top cover set 20 is made up of a top cover 21, a first top spacer 22, a middle cover 23 and a second top spacer 24, where the top cover 21 is provided with a mounting hole 211 at each of four corners and the center, offering a fastener S1 (for instance: bolt) for a threaded connection with each hole, having an outtake tube 212 at its top, but the tube has a segment extending from the bottom, and having two trenches 213, 214 at its bottom, where one ends of both extend out to the side of the top cover 21 to form through holes 2131, 2141 respectively, which is the locus for installing a switching solenoid valve 55, once the switching solenoid valve 55 is powered on, the two trenches 213, 214 are connected by means of the through holes 2131, 2141; the first top spacer 22, attached closely to the bottom side of the top cover 21, is provided with a mounting hole 221 at each of its four corners and the center that corresponds to the mounting hole 211 of the top cover 21, where both are placed together for a penetration by the fastener S1, having a piercing hole 222 for offering a tight penetration by the bottom portion of the outtake tube 212, and having small piercing holes 223, 224 set up at the locations corresponding to the ends of the trenched 213, 214 at the bottom side of the top cover 21; the middle cover 23, attached closely to the bottom side of the first top spacer 22, is provided with a mounting hole 231 at each of its four corners and the center that corresponds to the mounting hole 221 of the first top spacer 22, where both are placed together for a penetration by the fastener S1, having a piercing hole 232 for offering a tight penetration by the bottom portion of the outtake tube 212; the middle cover 23 is provided with a left air cave 233 and a right air cave 234 at its top, where the bottom of the caves are connected downward by the through holes 2331, 2341; the air caves 233, 234 each has a duct 2332, 2342 respectively and both ducts are joined and flow down through a gas-collecting hole 235, and an upward vent hole 236 is set up in front of the gas-collecting hole 235 which connects to a trench 237 that is set up at the top side of the middle cover 23, and the other end of the trench 237 is set up into a piercing tube 238 that goes downward; the piercing tube 238 is penetrated by an extension tube 239 that can extend into the air filtration tank 15; during assembly, a gas shut membrane 2333, 2343 is being placed into each of the air caves 233, 234 respectively, followed by attaching to the bottom side of the first top spacer 22, and small through holes 2334, 2344 are set up corresponding to the places of small through holes 223, 224 on the first top spacer 22; the second top spacer 24, placed closely between the bottom side of the middle cover 23 and the top side of the body shell 10, is provided with a mounting hole 241 at each of its four corners and the center that corresponds to the mounting hole 231 of the middle cover 23, and both are placed together for a penetration by the fastener S1, where the S1 is eventually fastened to the mounting hole 101 on the top of the body shell 10 for a firm link, and the second top spacer 24 is provided with a through hole 242 for offering a tight penetration by the bottom portion of the outtake tube 212; through holes 243, 244, 245, 246 and 248 are set up at the places that correspond to the through holes 2331, 2341 of the middle cover 23, the gas collecting hole 235, the vent hole 236 and the piercing tube 238 respectively, and small piercing holes 2433, 2443 are set up at the places that correspond to the small piercing holes 2334, 2344 of the middle cover; where the through holes 243, 244 and the small piercing holes 2433, 2443 are connected to the big tanks 11, 12 respectively; the through holes 245, 246 are connected to the gas storage tank 14; and the through hole 248 to the air filtration tank 15.

Figure 9:
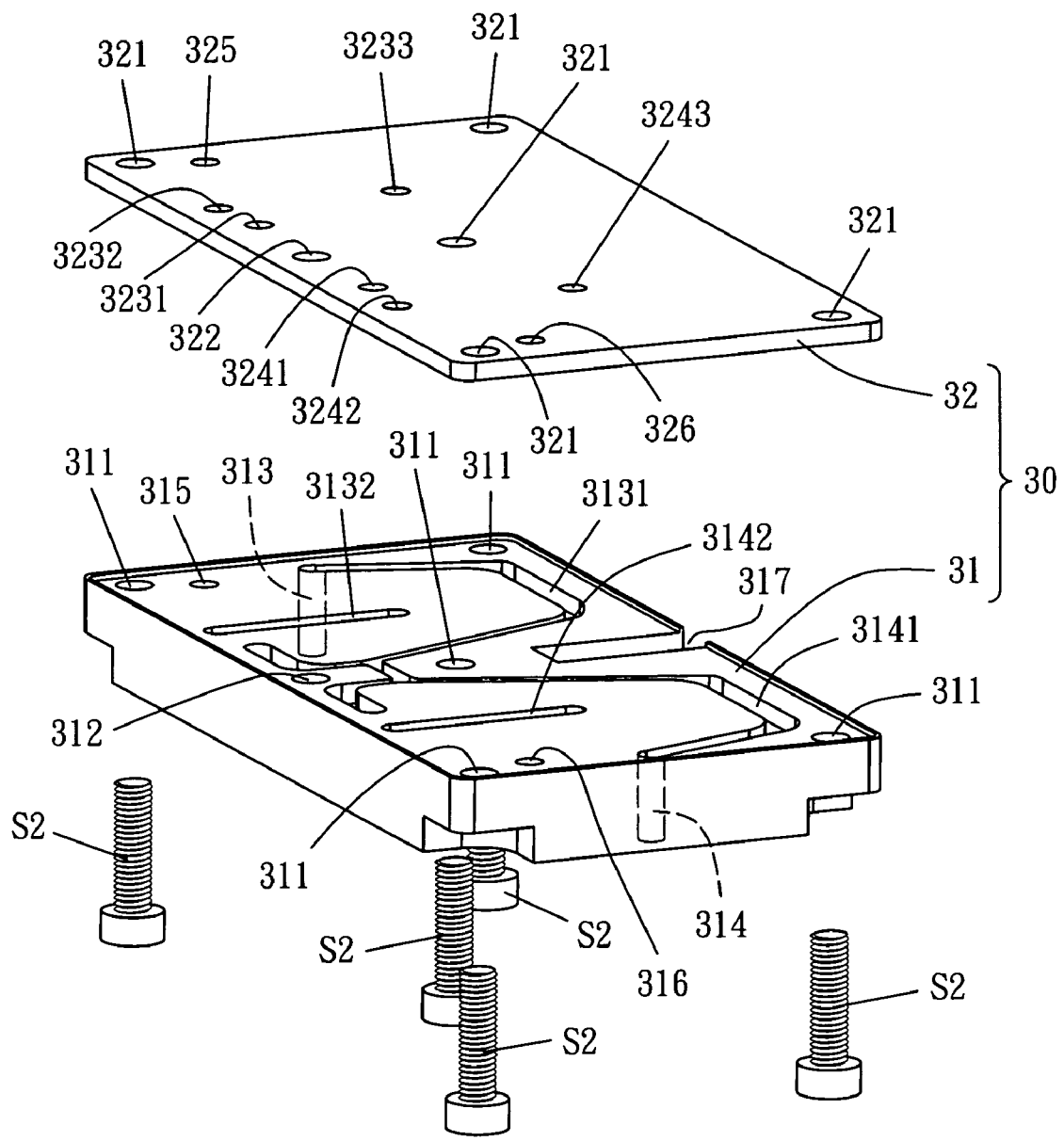
FIG. 9 is a three-dimensional exploded front and top elevation of the bottom cover set of the exemplified embodiment of the present invention.

Referring to FIGS. 3, 4 & 9, the bottom cover set 30 is made up of a bottom cover 31 and a bottom spacer 32, where the bottom cover 31 is provided with a mounting hole 311 at each of four corners and the center, offering a fastener S2 (for instance: bolt) for a threaded connection with each hole, having a downward piercing hole 312 set up near the front edge on its top side, and two downward piercing holes 313, 315 and 314, 316 at each of two side edges, where the piercing holes 313, 314 each joins a curved trench 3131, 3141 respectively on the top side of the bottom cover 31, and trenches 3132, 3142 each is set up near one of two sides; the bottom cover 31 is provided with a plug dent 317 at its back side; the bottom spacer 32, placed closely between the bottom cover 31 and the bottom side of the body shell 10, is provided with a mounting hole 321 at each of its four corners and the center that corresponds to the mounting hole 311 of the bottom cover 31, and both are placed together for a penetration by the fastener S2, where the S2 is eventually fastened to the mounting hole 102 at the bottom of the body shell 10 for a firm link, the bottom spacer 32 is provided with piercing holes 322, 325 and 326 that correspond to the piercing holes 312, 315 and 316 of the bottom cover 31, and piercing holes 3231, 3241 set up at the other end that correspond to the trenches 3131, 3141. Piercing holes 3232, 3233 and 3242, 3243 are set up that correspond to the both ends of the trenches 3132, 3142 respectively.

The air pump 40, positioned below the bottom cover 31 and both being fixedly joined, has a gas-in hole 42 that corresponds to the piercing hole 312 of the bottom cover 31, and outtake tubes 43, 44 that correspond to the piercing holes 313, 314 respectively. The pumping of airflow internally by its motor is not included in this content.

Figure 10:
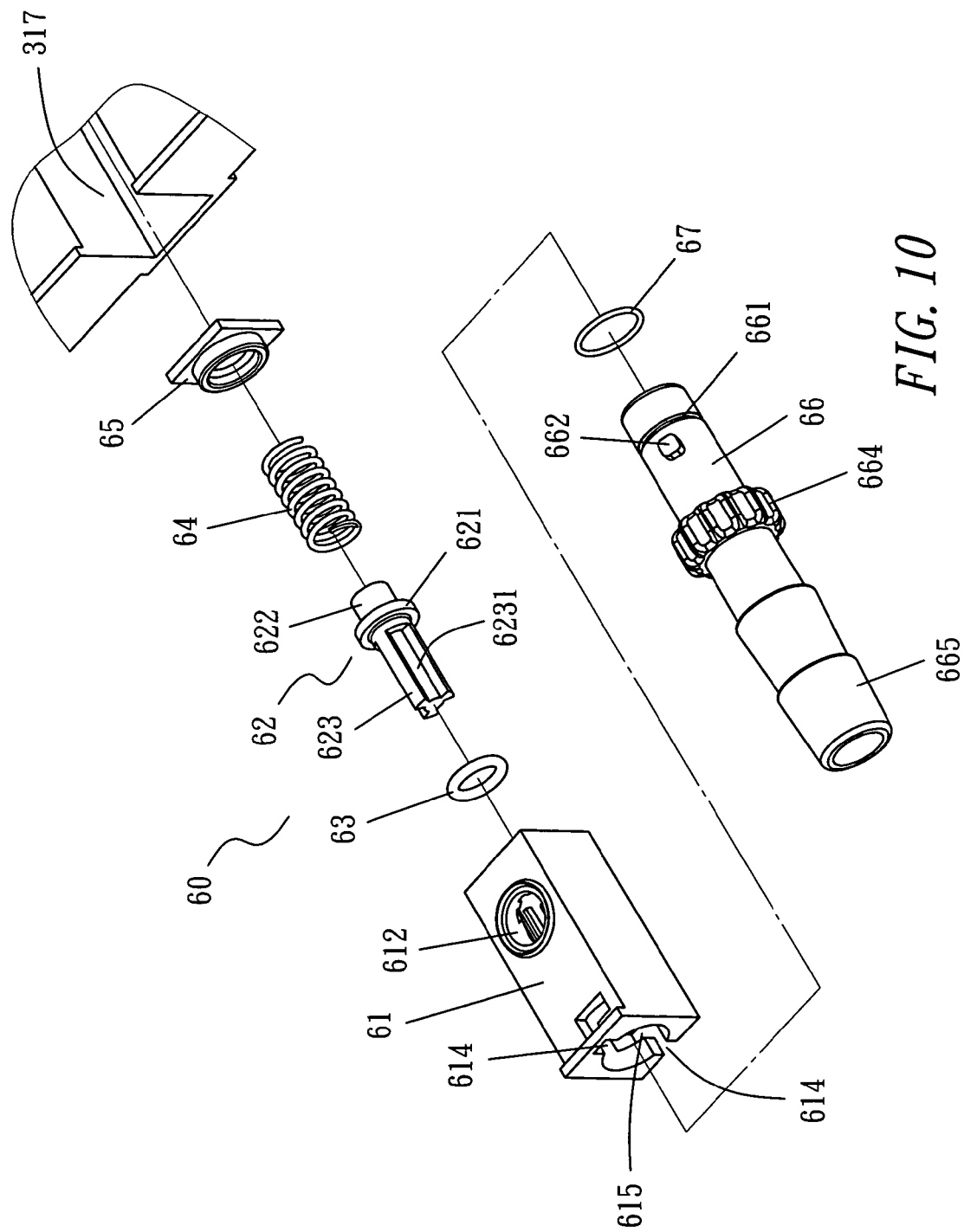
FIG. 10 is a three-dimensional exploded view of the watering control set of the exemplified embodiment of the present invention.
Figure 11:
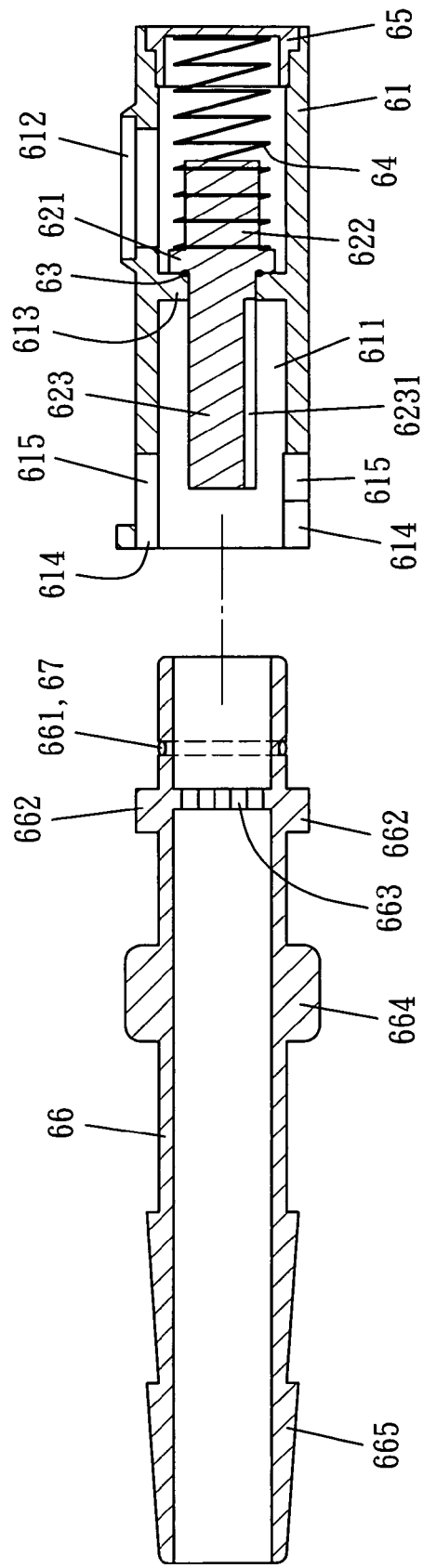
FIG. 11 is an assembled sectional exploded view of the watering control set of the exemplified embodiment of the present invention.

Referring to FIGS. 10 & 11, the watering control set 60 is made up of an outer shell 61, an inner block 62, a blocking ring 63, an elastic article 64, a back cover 65, a front plug tube 66 and a tightening ring 67; the internal of the outer shell 61 forms a lengthwise chamber 611, and a through hole 612 is extended to the top of the shell, where the middle portion of the internal has an annular wall 613, and a top and a bottom aligned dents 614 are right at the front entrance of the chamber, a short distance from the entrance the shape becomes an arced trough 615; the inner block 62 is provided with an annular bulge 621, and its back end shapes a cylinder 622, while the front end is a movable pillar 623, on which several lengthwise grooves 6231 are set up; the block ring 63 is put on the movable pillar 623 of the inner block 62 and to the innermost, followed by inserting the inner block 62 into the lengthwise chamber 611 from the backend opening of the outer shell 61, and further push the movable pillar 623 into the front part of the annular wall 613, until a reach to the annular wall 613 by the annular bulge 621 and the block ring 63 that comes to a completely sealed state, and the elastic article 64 is put on the cylinder 622, followed by covering the backend opening of the outer shell 61 by the back cover 65, such that one end of the elastic article 64 jostles against the annular bulge 621, and the other end against the back cover 65; as the above assembly is accomplished, the set is ready to be inserted into the plug dent 317 at the back side of the bottom cover 31 with a firm joining.

Figure 12:
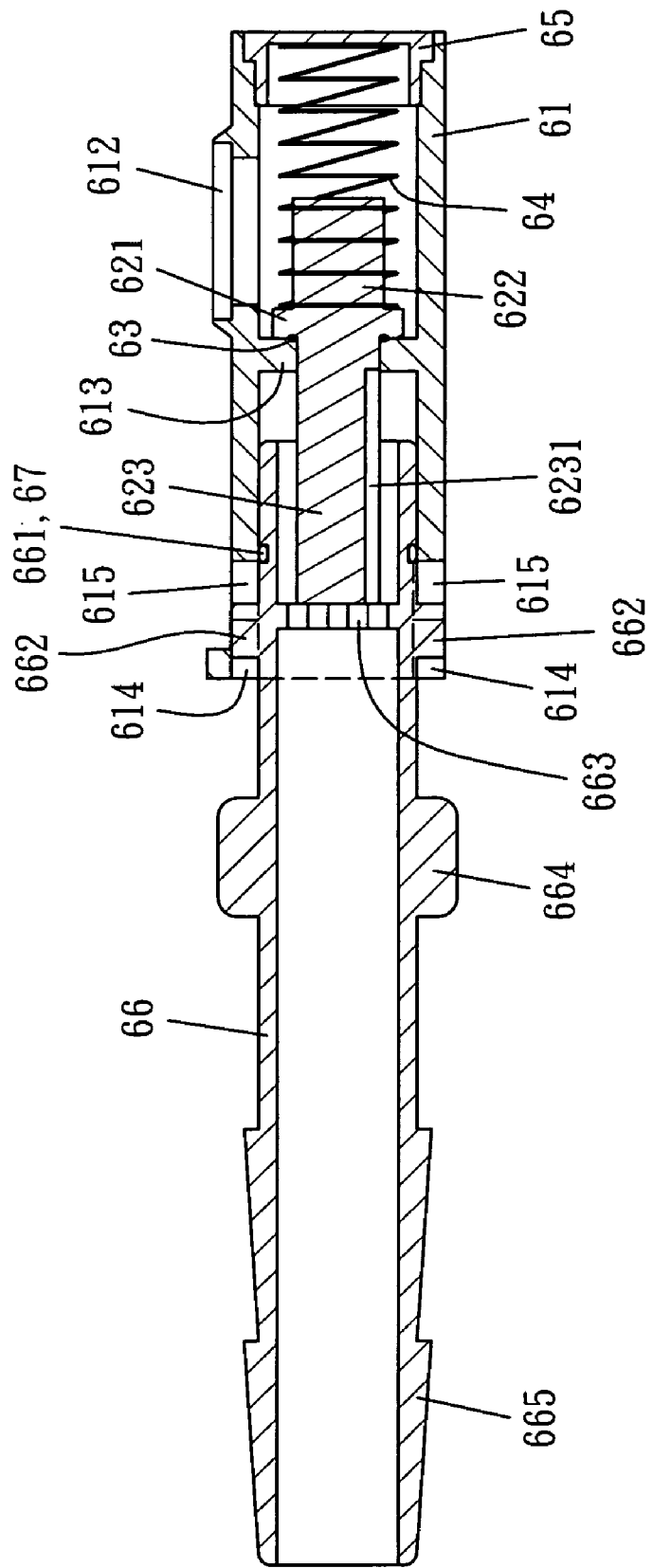
FIG. 12 is a schematic diagram showing the assembled procedure of the watering control set of the exemplified embodiment of the present invention.
Figure 13:
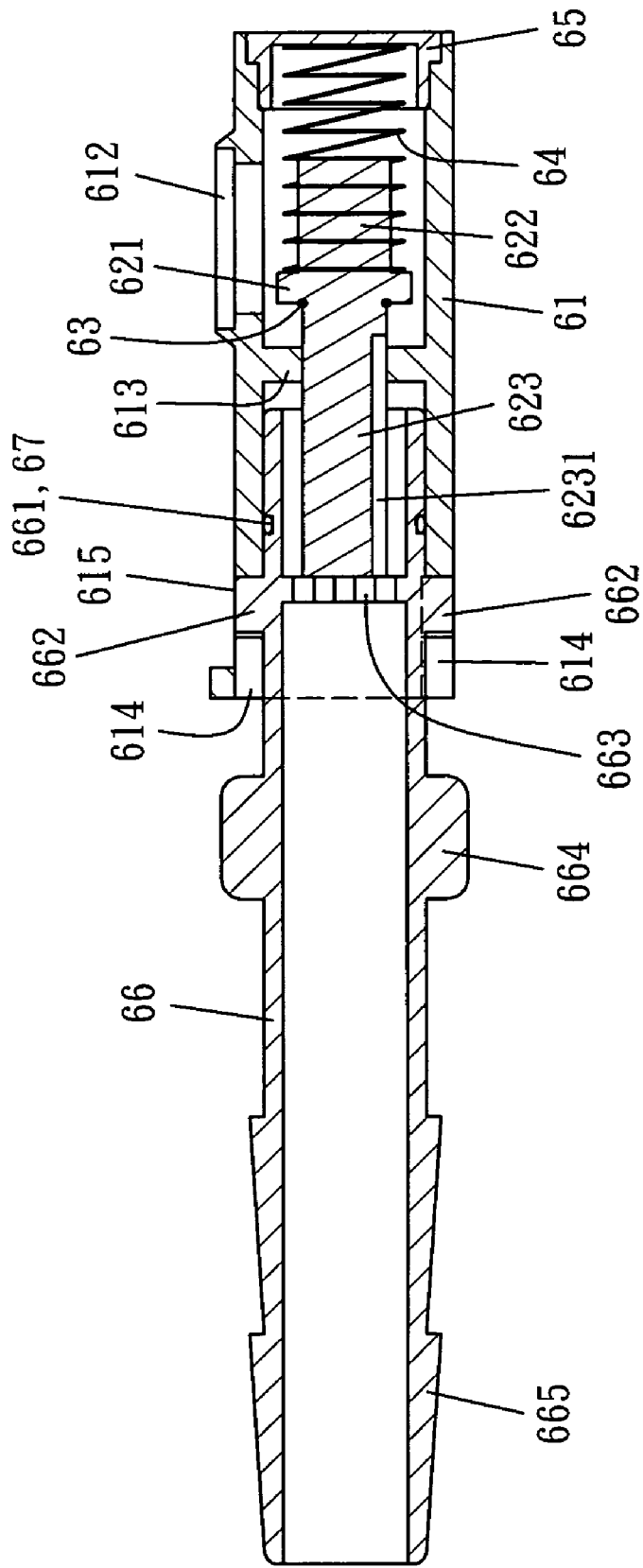
FIG. 13 is a schematic diagram showing the accomplished assembly of the watering control set of the exemplified embodiment of the present invention.
Figure 14:
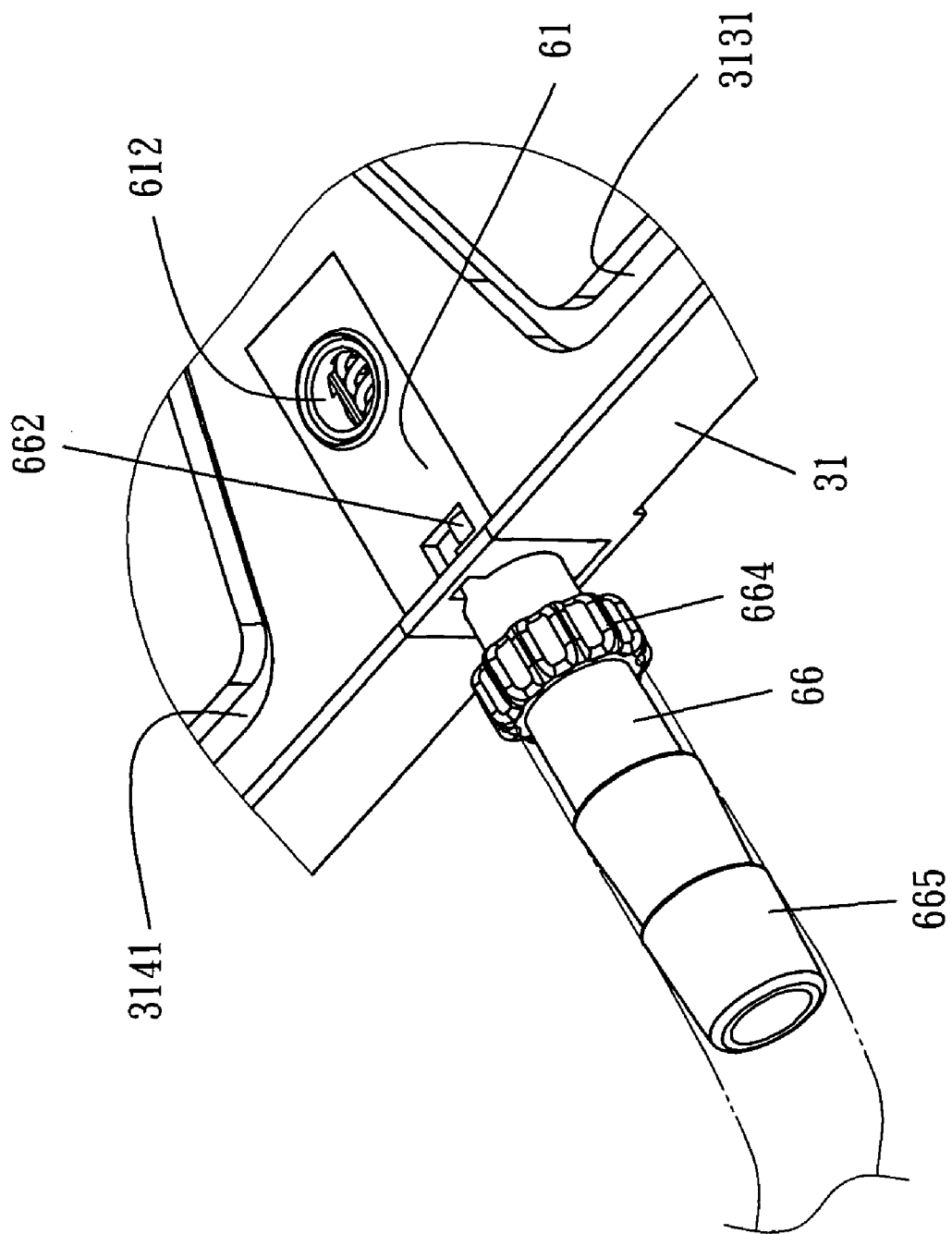
FIG. 14 is a schematic diagram showing the location of assembling the watering control set of the exemplified embodiment of the present invention.

The front plug tube 66 is a parts used on demand only, having a shape of circular piping and being lengthwise hollow, and its outer surface is provided with a joining trough 661 for lodging the tightening ring 67, and has two protruded aligned chunks 662 symmetrically located at the top and the bottom, where its internal is provided with an annular channel wall 663, and the external is provided with a raised holding loop 664, which is designed for the handy manipulation by the hand, and the front is a joining end 665 with a plurality of pipe threads; the uses shown in FIGS. 12-14, the holding loop 664 is grasped to insert the back end of the front plug tube 66 into the front end of the outer shell 61 (shown in FIG. 12), and let the aligned chunks 662 to pass through corresponding aligned dents 614 until the arced troughs 615 are reached, then rotate along the arced trough 615; at the moment the aligned chunks 662 are blocked by the wall at the front of the outer shell 61 and unable to exit, presenting an immobile state, and the channel wall 663 will push the inner block 62 back off to resist the elasticity of the elastic article 64, which moves the annular bulge 621 and the block ring 63 off the annular wall 613 (shown in FIG. 13), and the front and back spaces, separated by the annular wall 613, are linked; the joining end 665 is joined firmly with the extended watering pipe (shown in FIG. 14); once the whole assembly is accomplished, a demand for draining liquid from the back space of the outer shell 61, can be fulfilled by exploiting the watering control set 60.

Figure 1:
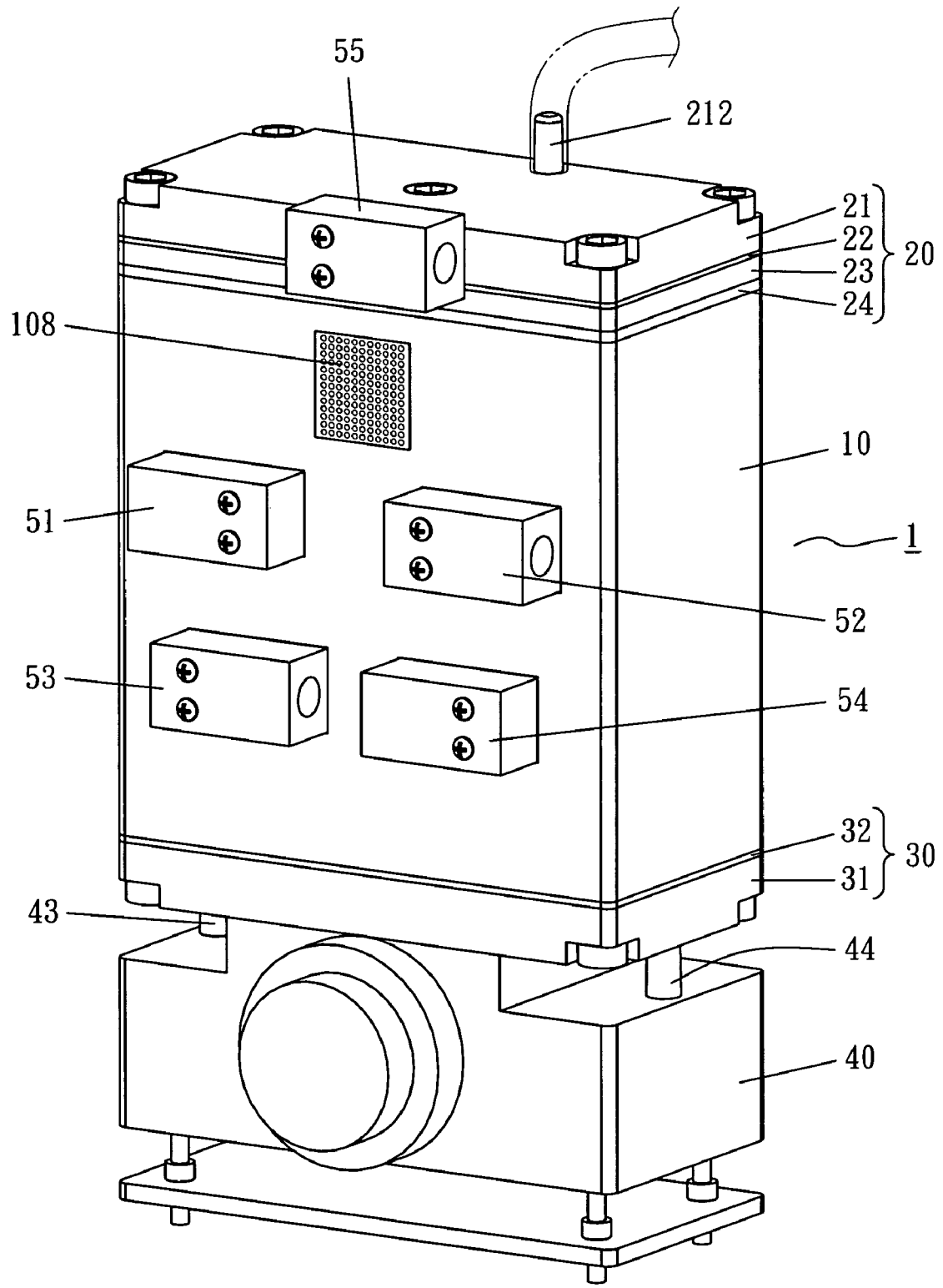
FIG. 1 is a three-dimensional exterior front elevation of the exemplified embodiment of the present invention.

During assembling the above parts, first have the watering control set 60 combine with the bottom cover set 30, second have the body shell 10 combine with the bottom cover set 30, again have the bottom cover set 30 combine with the air pump 40, then load the big tanks 11, 12 with molecular sieve substances, further add pure water in the air filtration tank 15, and have the top cover set 20 combine with the body shell 10, followed by installing the switching solenoid valves 51, 52, 53, 54 and 55 on the body shell 10 and the top cover set 20, which accomplishes the assembly of the oxygen generator 1 shown in FIGS. 1 & 2.

Power on the air pump 40 when in use, where air is pumped for filtering by the filtration slice 108 and then sent to the gas intake passage 13, again passing through the through hole 1013 at the bottom of the body shell 10, and down through the piercing hole 322 of the bottom spacer 32 and the piercing hole 312 of the bottom cover 31. The airflow then enters the gas-in hole 42 of the air pump 40, and in the pump the airflow is divided into two paths, the outtake tubes 43, 44 at both sides, which flow into the piercing holes 313, 314 of the bottom cover 31 respectively, and then move along the trenches 3131, 3141, the piercing holes 3231, 3241 of the bottom spacer 32, and the piercing holes 1011, 1021 at the bottom side of the body shell 10, into the airflow channels 111, 121 for a stay and to produce high pressure; the auto-control system (optional, not shown in the figure) takes the control of the activation of the switching solenoid valves 51, 52 alternately, where its function is once the switching solenoid valve 51 activates (meanwhile, the switching solenoid valve 52 quits, or reacts after some time), the air in the airflow channel 111 flows through the through holes 1031, 1032 to the airflow channel 112, and further goes down through the through hole 1012 of the bottom spacer 32, the trench 3132 of the bottom cover 31, and the through hole 1001 at the bottom side of the big tank 11 into the bottom of the big tank 11, which is then pushed to pass through the molecular sieve substances to transform into oxygen and flows up for a gathering; the oxygen passes through the through hole 243 of the second top spacer 24 and the through hole 2331 of the middle cover 23 to the air cave 233, and opens the gas shut membrane 2333 to flow up and along the duct 2332 and through the gas collecting hole 235 and the through hole 245 down to the gas storage tank 14 for a stay, which then gathers into high pressure. As oxygen arrives the duct 2332, it passes along the duct 2342 to the air cave 234 too, where its pressure presses the gas shut membrane 2343 to move down to cap the through hole 2341, which makes the oxygen unable to pass through here into the big tank 12, so that the gas shut membranes 2333, 2343 are the exemplified embodiment of a reverse-way barricade device; however the big tank 12 is not suitable for no oxygen, the auto-control system will control the switching solenoid valve 55 to activate, for pumping a small amount of oxygen from the big tank 11 through the small piercing holes 2433, 2334, 223 and the trench 213 to the through hole 2131, and turns to enter the through hole 2141 and through the trench 214 and the small piercing holes 224, 2344, 2443 into the big tank 12 for a stay, which makes the real time oxygen output possible.

Since the process of air passing through the molecular sieve substances to transform into oxygen generates heat; therefore, after some time of activation, the auto-control system will control the switching solenoid valve 51 to pause, which makes the air in the airflow channel 111 fail to go through the through holes 1031, 1032 into the airflow channel 112; meanwhile, it controls the switching solenoid valve 53 to activate, making the air in the airflow channel 112 flow through the through holes 1051, 1052 into the gas outtake channel 113, again by flowing through a lower path to the other gas outtake channel 114, and down through the piercing hole 325 of the bottom spacer 32 and the piercing hole 315 of the bottom cover 31 to be exhausted to the outside, to lower the pressure in the airflow channel 112. Before the stop or the partial stop of the switching solenoid valve 51, the auto-control system will adaptively control the activation of the other switching solenoid valve 52, to accomplish the generation of oxygen by passing the other set of corresponding parts equivalent to the aforesaid process, and eventually the oxygen flows through the gas collecting hole 235 and the through hole 245 down to the gas storage tank 14 for a stay.

In this invention, the amount of oxygen in the gas storage tank 14 is raised, subject to the alternate generation of oxygen by the big tanks 11 and 12. Once oxygen is demanded, an extended pipe (shown in FIGS. 1 & 2) is inserted into the outtake tube 212 for the user's convenient access, and switch the air-out button on (optional, not shown in the figure) to let the oxygen flow out from the outtake tube 212 to the extended pipe. The reason is that the high pressure oxygen in the gas storage tank 14 is passing through the through hole 246, the vent hole 236, the trench 237, the piercing tube 238, and the extension tube 239 to enter the air filtration tank 15 for the filtration by the pure water, after that the oxygen gets cleaner and goes up for a gathering, lastly the oxygen is offered for use by flowing through the outtake tube 212 and the extension tube 239.

Figure 15:
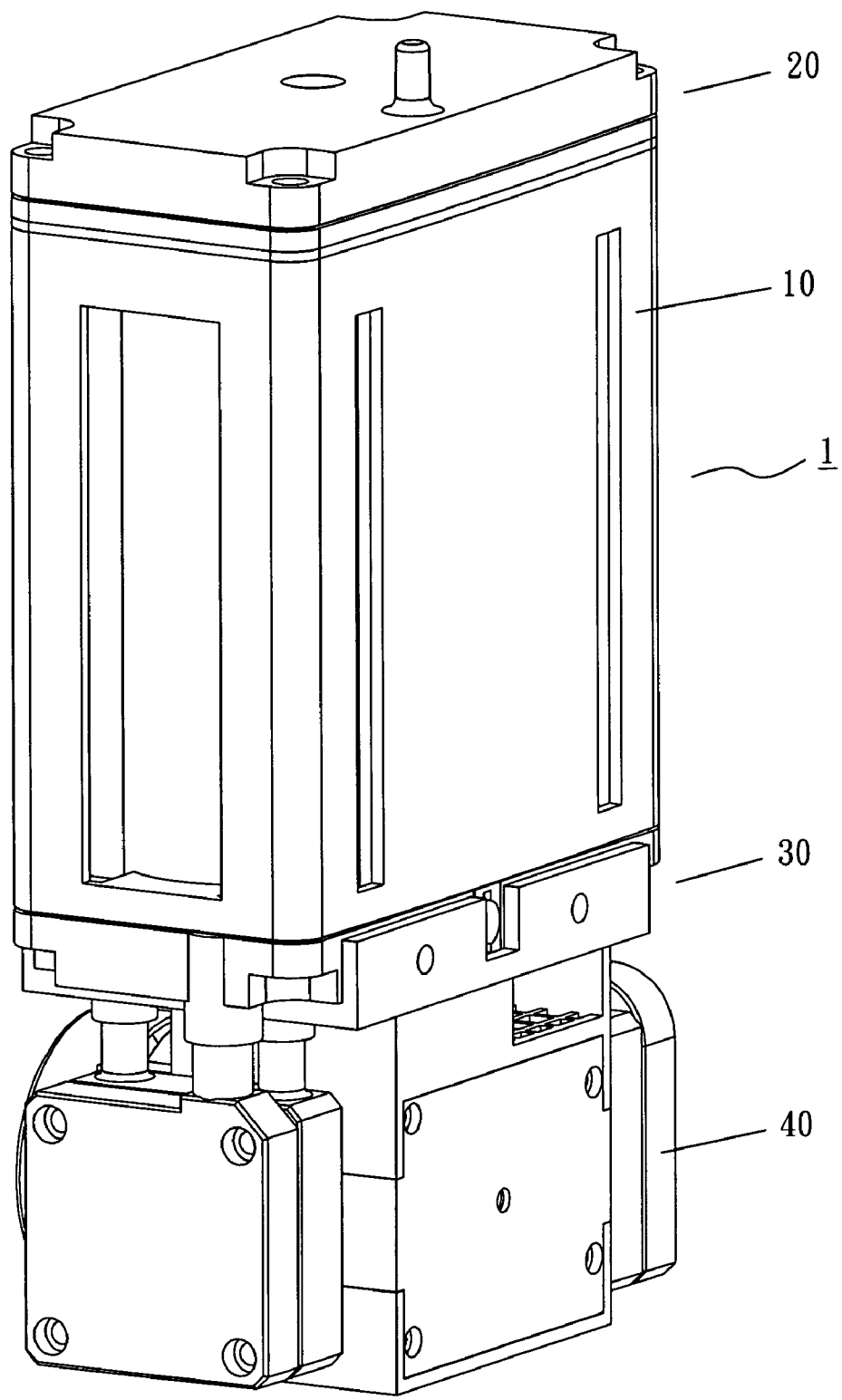
FIG. 15 is a three-dimensional exterior view of another exemplified embodiment of the present invention.
Figure 16:
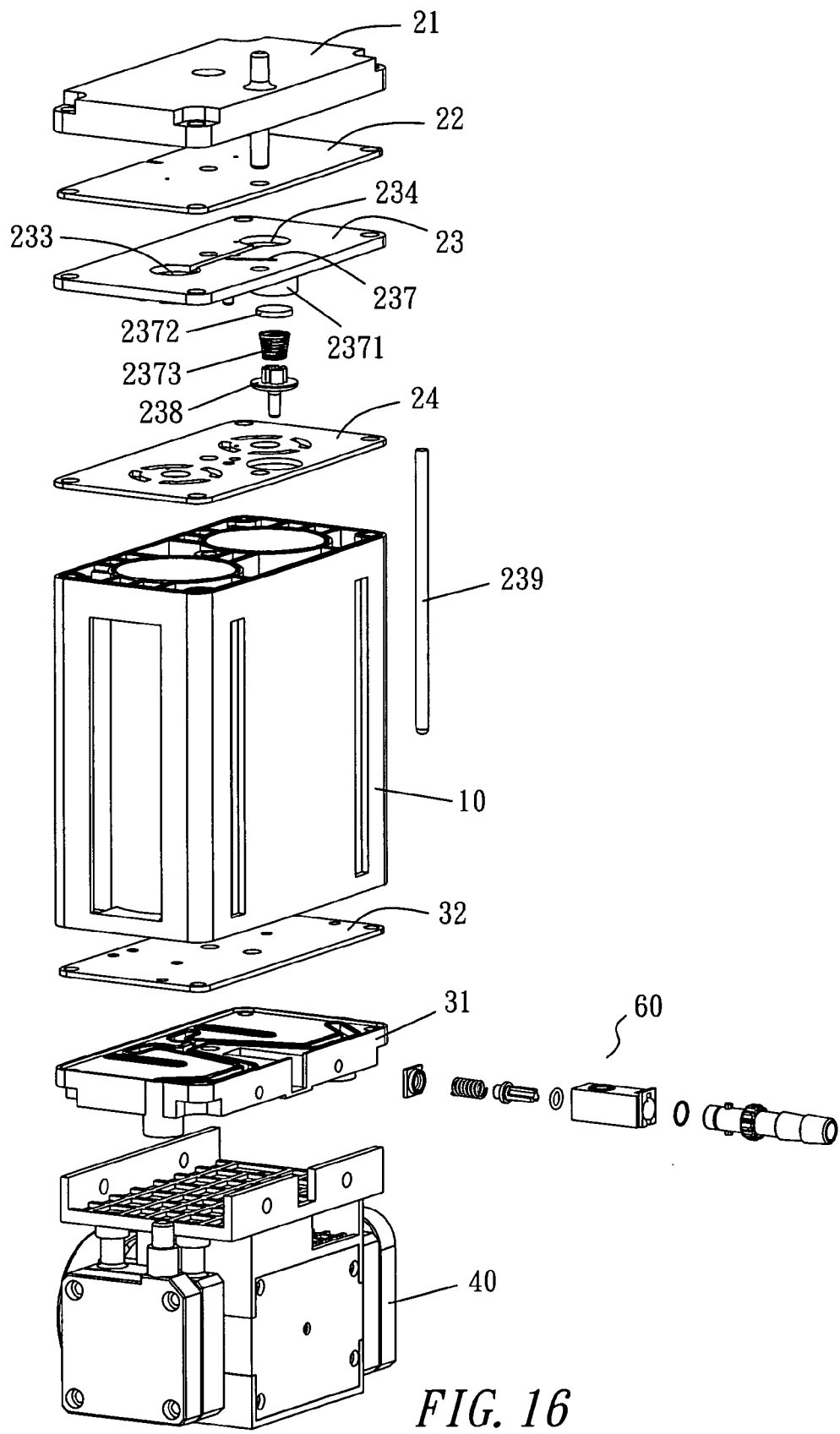
FIG. 16 is a three-dimensional exploded view of another exemplified embodiment of the present invention.
Figure 17:
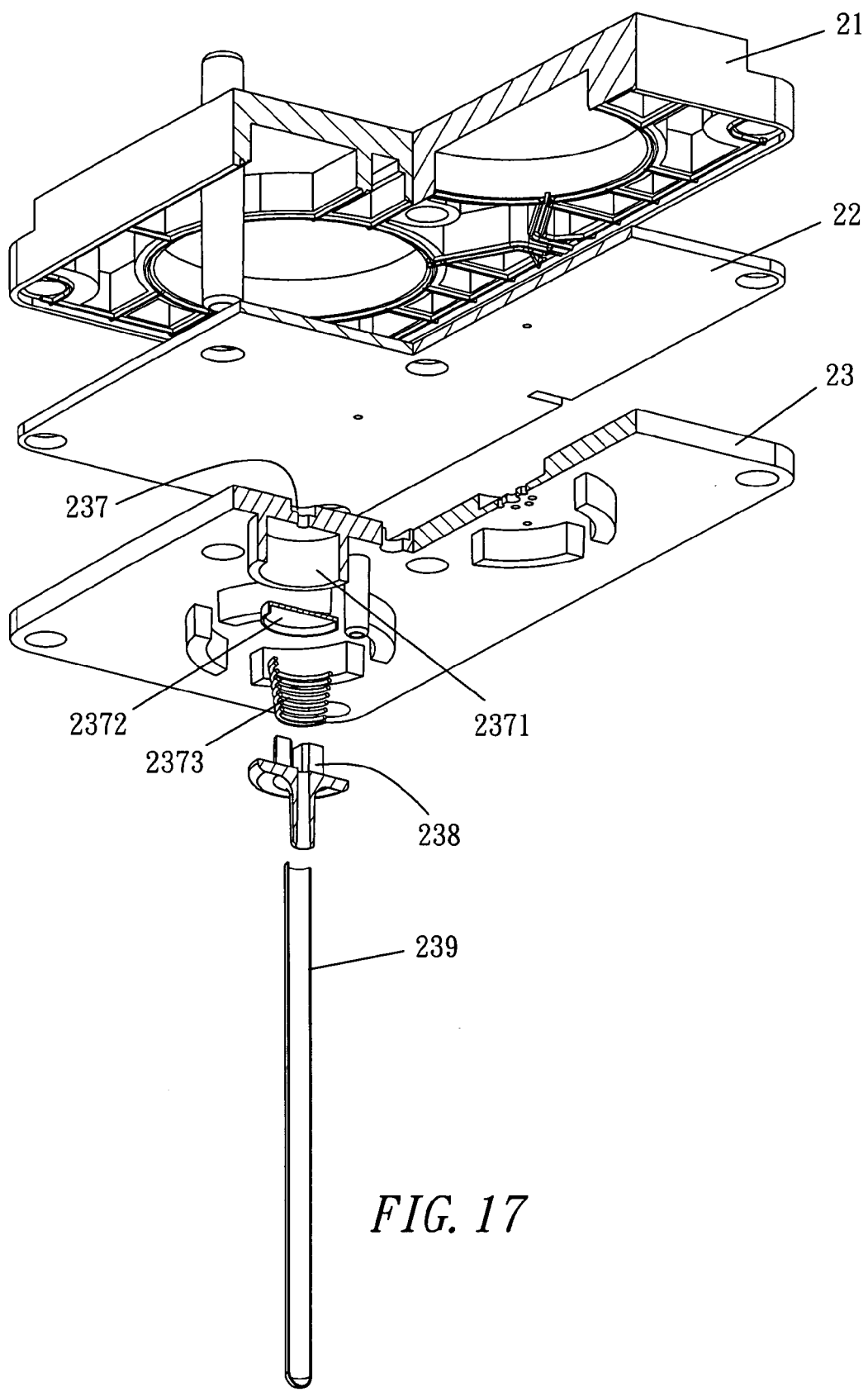
FIG. 17 is a three-dimensional exploded sectional partial view of the top cover set of another exemplified embodiment of the present invention.

The oxygen generator 1 of this invention can have many equivalent embodiments or modifications without departing from the scope of the claims of the present invention; for instance, 1.) referring to FIG. 15, the outlook of the oxygen generator 1 of this invention can be altered to be more gorgeous. Since this alteration has absolutely no affection on the functioning of this invention, it can be construed as within the scope of the claims of the present invention; 2.) referring to the oxygen generator 1 in FIG. 15, the three-dimensional exploded view of the embodiment and the three-dimensional sectional exploded of the partial parts are shown in FIGS. 16 & 17 respectively, where the majority of the parts are equivalent to the foregoing shown in FIGS. 1-14, only the gas shut membranes 2333, 2343 accommodated in the air caves 233, 234 of the middle cover 23 are reduced. Referring to FIGS. 16 & 17, a lodging cavity 2371 is shaped and placed below one end of the trench 237, for accommodating a gas shut membrane 2372, jostled by one end of an elastic article 2373, and below it one end of the piercing tube 238 is inserted into the lodging cavity 2371 and jostled against the other end of the elastic article 2373, for a firm joining, where the bottom end of the piercing tube 238 is inserted in the extension tube 239; the sectional view of that part after assembly is shown in FIG. 18, once without using oxygen, the pressures in the internal and external are in balance, so that the gas shut membrane 2372, jostled by the elastic article 2373, blocks the trench 237 from releasing air; when using oxygen, the internal pressure of the air filtration tank 15 is relatively low, as soon as the high pressure oxygen arrives at the trench 237 as in FIG. 19, it will push the gas shut membrane 2372 to resist the elasticity of the elastic article 2373, which brings in deformation at the edges that will let the oxygen flow through, and along the extension tube 239 into the pure water of the air filtration tank 15, the rest just functions the same. The gas shut membrane 2372 and the elastic article herein is an exemplified embodiment of a reverse-way barricade device.

It's essential to describe further that the foregoing exemplified embodiment is based on adopting "two" big tanks 11, 12; therefore, all the other parts that operated in coordination with the two big tanks include airflow channels 111 & 112 and 121 & 122; gas outtake channels 113 & 114 and 123 & 124; air caves 233 & 234 and trenches 213 & 214, which all have quantity of two, to form two sets that can generate oxygen alternately. However, the actual implementation is not limited to two sets in quantity only. It could be three, four and the like, which is within the scope of the claims of the present invention.

Accordingly, the present invention makes use of the combination among the body shell 10, top cover set 20, bottom cover set 30, air pump 40, switching solenoid valves 51, 52, 53, 54 and 55 and the watering control set 60, to achieve an oxygen generator that features novelty in combination pattern, compactness for the assembly, handiness in the carrying or transporting and roominess for cutting down the cost and price. The spatial pattern of the structural combination of the disclosed oxygen generator of the present invention is not only unknown to the prior art, but absolutely being novel, which can accomplish the expected objective and function, and is construed as being absolutely creative and is compliant to the requirements of patent law, and a patent application for the invention is then filed.

What is claimed is:
1. An oxygen generator, comprising:
a body shell shaped into a plurality of connecting septum walls within an interior thereof to form at least two tanks, the body shell comprising:
a plurality of through holes that correspond to a gas intake passage, at least two sets of airflow channels, at least two sets of gas outtake channels, at least two tanks, and an air filtration tank;
a plurality of mounting recesses, wherein the plurality of mounting recesses has at least one kind of through hole that is configured to connect at least one set of adjoined airflow channels of the at least two sets of airflow channels, and at least one kind of through hole that is configured to connect at least one airflow channel of the at least two sets of airflow channels to at least one adjoined gas outtake channel of the at least two sets of gas outtake channels,
a mounting through recess having a plurality of switching solenoid valves and a filtration slice, wherein the plurality of switching solenoid valves are configured to control circulation between the at least one set of adjoined airflow channels and circulation between the at least one airflow channel and the at least one adjoined gas outtake channel,
wherein the at least two tanks are filled with molecular sieve substances and wherein the body shell is surrounded by the gas intake passage, the at least two sets of airflow channels, the at least two sets of gas outtake channels, the gas storage tank, and the air filtration tank for filling with pure water;

a top cover set, wherein the top cover set is fixedly mounted on top of the body shell, the top cover set comprising:
a top cover provided with an outtake tube,
the outtake tube mounted on a top side of the top cover set;
a first top spacer, wherein the first top spacer is closely attached to a bottom side of the top cover and has a through hole which is configured to engage a bottom segment of the outtake tube, wherein a middle cover is closely attached to a bottom side of the first top spacer and has a through hole which is configured to engage the bottom segment of the outtake tube,
the middle cover having a plurality of air caves on a top side of the middle cover, wherein a bottom of the plurality of air caves has a plurality of downward through holes, and wherein each of the plurality of air caves has a duct, each duct of the plurality of air caves joined to flow down through a gas-collecting hole, wherein a reverse-way barricade device is positioned between the joined ducts of the plurality of air caves and an outlet of the gas-collecting hole, further wherein an upward vent hole is positioned in front of the gas collecting hole which extends to a trench positioned on the top side of the middle cover, wherein one end of the trench is made into a piercing tube stretching downward that is inserted into an extension tube that is extended into the air filtration tank;
a second top spacer is positioned closely between a bottom side of the middle cover and a top side of the body shell, the second top spacer comprising:
a through hole that tightly penetrates the bottom segment of the outtake tube, and
a plurality of through holes configured to attach to the corresponding plurality of downward through holes of the middle cover, the gas collecting hole, the vent hole, and the piercing tube, respectively, wherein the plurality of through holes attached to the plurality of downward through holes are connected to the at least two tanks, the plurality of through holes attached to the gas collecting hole and vent hole are connected to the gas storage tank, and the plurality of through holes attached to the piercing holes are connected to the air filtration tank;
a bottom cover set, wherein the bottom cover set is fixedly mounted on bottom of the body shell, the bottom cover set comprising:
a bottom cover comprising:
a top side provided with a downward piercing hole near a front edge on the top side of the bottom cover that corresponds to a through hole at a bottom side of the gas intake passage of the body shell,
at least two downward piercing holes near at least two side edges of the bottom cover, wherein at least one downward piercing hole of the at least two downward piercing holes on each side edge joins one end of a curved trench on the top side of the bottom cover near the respective side edges,
at least two trenches, wherein each trench of the at least two trenches is positioned near one of two sides of the bottom cover, and
a plug dent, wherein the plug dent is positioned near a back side of the bottom cover; and a bottom spacer placed between the bottom cover and a bottom side of the body shell, wherein the bottom spacer is provided with aligned piercing holes that correspond to the through holes at the bottom side of the gas intake passage of the body shell, at least one downward piercing hole of the at least two downward piercing holes on each side edge that is not joined to the curved trench on each side, the other end of each curved trench, and the at least two trenches near one of two sides of the bottom cover;

an air pump fixedly joined to the bottom cover having a gas-in hole that corresponds to the through hole at the bottom side of the gas intake passage of the body shell, and at least two outtake tubes that corresponds to the piercing holes near both side edges of the bottom cover connected to the curved trenches;

and a watering control set comprising:
an outer shell, wherein the outer shell is inserted in the plug dent at a back of the bottom cover for securely joining of the outer shell, the outer shell comprising an internal space having a lengthwise chamber and a through hole that extends to a top of the outer shell, wherein a middle portion of the internal space has an annular wall, and top and bottom aligned dents positioned at a front entrance of the lengthwise chamber, wherein near the entrance of the chamber, the internal space has a shape of an arced trough,
an inner block having an annular bulge, wherein a back end of the inner block is shaped as a cylinder and a front end is a movable pillar having several lengthwise grooves,
a blocking ring is placed at an innermost position of the movable pillar of the inner block, wherein the inner block is inserted into the lengthwise chamber from a back-end opening of the outer shell, and the moveable pillar is positioned in front of the annular wall, until the annular bulge and the block ring reach the annular wall to become completely sealed,
an elastic article placed on the cylinder, and covering the backend opening of the outer shell by a back cover, wherein one end of the elastic article jostles against the annular bulge, and the other end against the back cover,
a front plug tube comprising a circular channel wall, wherein an internal space of the front plug tube is lengthwise hollow, and has an outer surface that is provided with a joining trough for coupling a tightening ring, and at least two protrusions symmetrically located at a top and a bottom of the lengthwise front plug tube.

2. An oxygen generator as in claim 1, wherein the top cover has a plurality of trenches on a bottom side of the top cover, where each trench of the plurality of trenches has one end extending out from a lateral side of the top cover to form a through hole, and a switching solenoid valve being installed thereon; the first top spacer having a small piercing hole set up at a location corresponding to each end of the trenches at the bottom side of the top cover; the middle cover having a small piercing hole corresponding to each of the small piercing holes on the first top spacer; the second top spacer having a small piercing hole set up at a location corresponding to each of the small piercing holes on the middle cover, where the small piercing holes are connected to the at least two tanks; the activation of a switching solenoid valve enabling higher pressure gas in one of the at least two tanks to pass through the corresponding adjoined small piercing hole to the corresponding trench, followed by flowing to another trench through the switching solenoid valve, and passing through the corresponding adjoined small piercing hole to the other tank of the at least two tanks.

3. An oxygen generator as in claim 1, wherein the reverse-way barricade device is implemented by placing a gas shut membrane in each air cave, wherein once air enters the air cave from the through hole of the middle cover, the air opens the gas shut membrane to flow up and along a passage to pass through the gas collecting hole and the through hole, and entering the gas storage tank for a stay; whereas a reverse-way air flow presses the gas shut membrane to cover the through holes, to achieve the barricade of the reverse flow of air.

4. An oxygen generator as in claim 1, wherein the reverse-way barricade device is implemented by shaping a lodging cavity placed at the bottom of the end of the trench on the top side of the middle cover, for accommodating a gas shut membrane, jostled by one end of an elastic article, and below the reverse-way barricade one end of the piercing tube is inserted in the lodging cavity and jostled against another end of the elastic article for a firm joining, where a bottom end of the piercing tube is inserted in the extension tube that is extended in the air filtration tank, once the air flowing from the trench to the lodging cavity, the air pushes the gas shut membrane to resist the elasticity of the elastic article, which brings in deformation at the edges that will let the air flow in, and along the extension tube into the air filtration tank; whereas a reverse-way air flow pushes the gas shut membrane to cover the trench, which achieves the barricade of the reverse flow of air.

5. An oxygen generator as in claim 1, wherein there are more than at least two tanks.

6. An oxygen generator as in claim 1, wherein the at least two sets of airflow channels that correspond to the at least two tanks is greater than two.

7. An oxygen generator as in claim 1, wherein the at least two sets of gas outtake channels that correspond to the at least two tanks is greater than two.

8. An oxygen generator as in claim 2, wherein the plurality of trenches that correspond to the at least two tanks is greater than two.

* * * * *